Nov. 22, 1960 — O. VON ZELEWSKY — 2,960,897
STEADY REST
Filed Dec. 14, 1954 — 2 Sheets-Sheet 1

INVENTOR.
OTTOMAR VON ZELEWSKY
BY

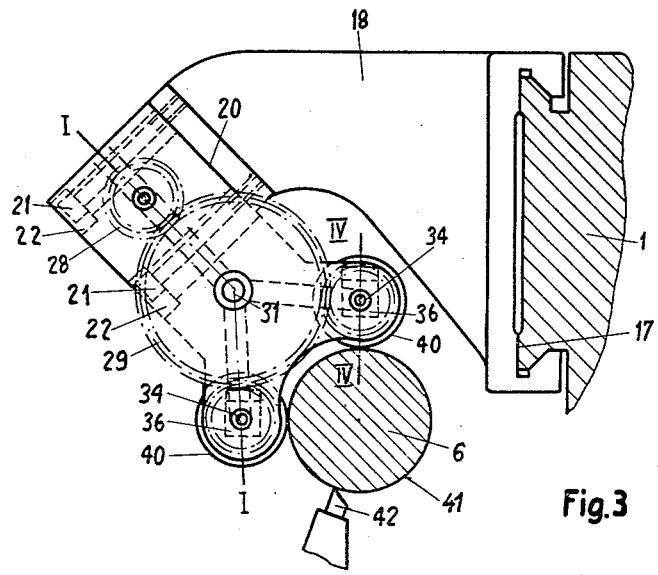
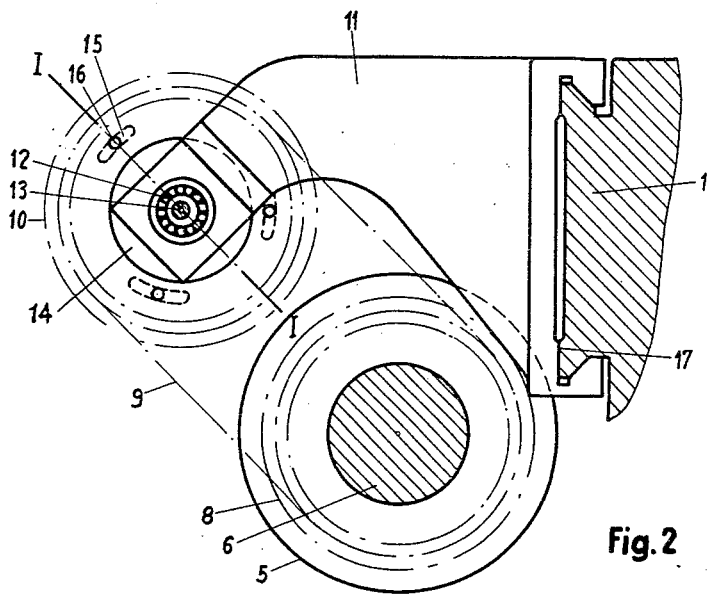

United States Patent Office 2,960,897
Patented Nov. 22, 1960

2,960,897

STEADY REST

Ottomar von Zelewsky, Neuhausen am Rheinfall, Switzerland, assignor to Georg Fischer Aktiengesellschaft, Schaffhausen, Switzerland, a Swiss company Filed Dec. 14, 1954, Ser. No. 475,178

Claims priority, application Switzerland Jan. 12, 1954

2 Claims. (Cl. 82—39)

The present invention relates to a steady rest for a machine tool, particularly one for the machining of long workpieces which are subject to warping during the machining or like working operation as a result of internal stresses or tensions.

It is well known that the machining of long, thin workpieces, with which a steady rest has to be used, presents difficulties insofar as when the outside diameters of the workpieces are being turned, i.e. particularly when the outer layer of material is being stripped off, the workpieces warp as a result of internal stresses or tensions so that the cylindrical moving parts in said rest, which at the beginning of the machining operation run concentrically to the axis of rotation, assume then an eccentric position.

If, now, the workpiece is centered by a positioning rest in this eccentric, moving bearing point of the rest throughout the whole machining operation, the said workpiece will not remain straight after being released.

The present invention enables this drawback to be eliminated and it is characterized by the fact that between the work spindle and the supporting elements of the workpiece, transmission means are arranged which convert the rotary movements of the work spindle synchronously into planetary oscillations of said supporting elements.

An embodiment of the invention is illustrated by way of example in the attached drawings in which:

Fig. 2 is a side view,

Fig. 3 is a partial view of the supporting elements employable in the invention.

Figures 1, 4, 5:
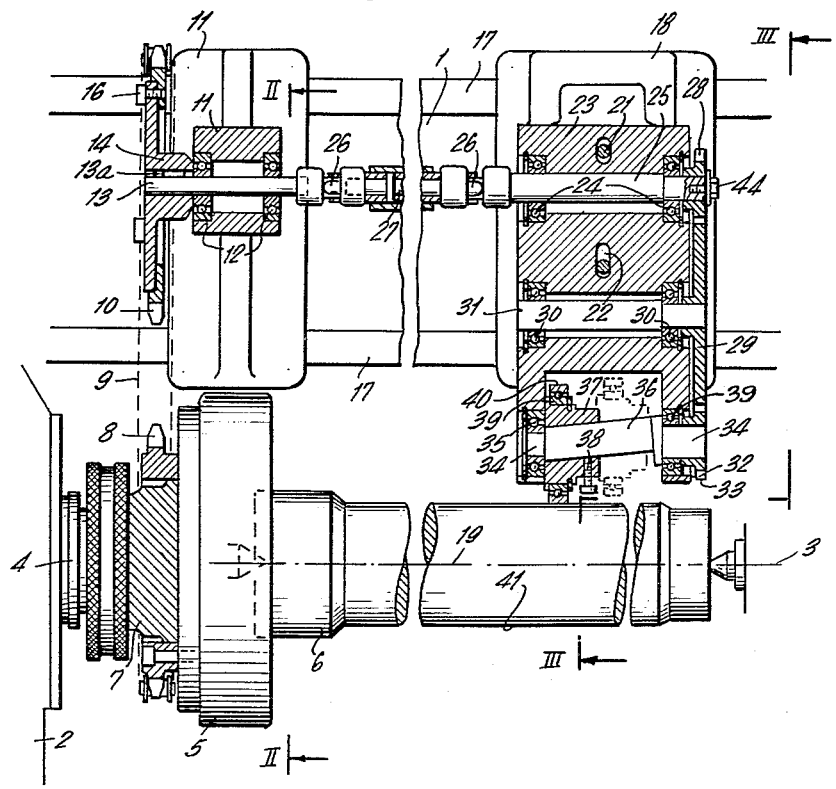
Fig. 1 is a plan view of a follow or positioning rest made according to the invention, shown partly in section taken along the lines I—I of Figs. 2 and 3.
Fig. 4 is a section taken along line IV—IV of Fig. 3, with the supporting element in eccentric position.
Fig. 5 is a section taken on line V—V of Fig. 4.

Figs. 1 to 5 show partial portions of a top arm 1 of a lathe bed consisting of a headstock 2 and a tailstock 3. Arranged on a spindle 4 mounted in the headstock 2 is a chuck 5 clamping a workpiece 6 in position the opposite end of which being held in the tailstock 3. A sprocket wheel 8 is mounted on the flange 7 of the chuck 5 and forms part of the transmission members between the work spindle and the supporting elements. From this sprocket wheel a chain 9 runs to another sprocket wheel 10 having the same number of teeth. A bearing bracket 11 (Fig. 2) can be locked on the top arm 1 (not illustrated) and on this bracket, a shaft 13 with a flange pulley 14 is mounted in bearings 12 and is keyed to shaft 13 by means of a key 13a. The rotational speed of the spindle 4 could of course also be transmitted to the shaft 13 by any other suitable means, e.g. directly from the headstock 2. The flange pulley 14, which is centred on the sprocket wheel 10, has in the embodiment illustrated three slots 15 in each of which a screw 16 mounted in the sprocket wheel 10 can be shifted or displaced. This arrangement enables mutual angular adjustments to be effected between the sprocket wheel 10 and the flange pulley 14.

On the top arm 1 there is mounted a bearing bracket 18 which is longitudinally shiftable and lockable at a desired location on guides 17 by means, which are not shown. On the bearing bracket 18 a housing 23 (Fig. 1) is shiftable in a direction vertical to the axis of rotation 19 in slides (not illustrated) of a bearing surface 20.

Screws 21 which are shiftable in slots 22 of the housing 23 and are located in the bearing bracket enable the housing 23 to be adjusted and locked on the bearing bracket 18. This adjustability is necessary in order to adapt the supporting elements 39, 40 to the diameter of the bearing point 41 of the workpiece 6. Forming a further part of the transmission members a shaft 25 is held in bearings 24 in the housing 23 and is connected to the shaft 13 via two ball-and-socket joints 26 and a telescopic shaft 27 of any desired design. A pinion 28, mounted on the shaft 25 and axially held by a screw 44, engages with a gear wheel 29 which is arranged on a shaft 31 mounted in bearings 30. The gear wheel 29 meshes with two pinions 32 which are located on shafts 34 running in bearings 33, 35. Between the bearings 33, 35 the shafts 34 have an arbor of square cross section 36, which is inclined at an acute angle to the axes of rotation of the respective ends of shafts 34 and inclined with respect to the axis of rotation of the work spindle. A hub 37 is longitudinally shiftable along each of the square arbors 36 and can be locked at any desired point by a set screw 38. On each of the hubs 37 there is a ball bearing with an outer race 40, which serves as a roller or supporting element of the steady rest for the bearing points 41 already machined or turned, of the workpiece 6. As the hubs 37 are longitudinally shiftable along the inclined arbors 36, it is possible to obtain a planetary motion of the rollers 39, 40 as regards to the axes of the bearings 33, 35. The eccentricity of this motion may be varied from zero, where the axes of rotation of the arbors 36 and those of the rollers 39, 40 coincide (shown in Fig. 1) up to a desired extent, as, for example, shown in Fig. 4, where, in operation, the axes of rotation of the rollers 39, 40 describe a circle around the axes of rotation of the bearings 33, 35. In place of the ball bearings 39, 40 serving as rollers, however, slide blocks could also be used which would be made to rotate in the same way by means of adjustable cams. The two slide blocks, however, could also be replaced by a common slide piece formed as a half bush.

Embodiments are also possible in which harmonic oscillations can be imparted to the supporting elements of the steady rest by electrical, hydraulic or pneumatic means, the synchronous movements and the phase agreement being possibly obtained by means of mechanical members. Embodiments are also conceivable in which mechanical transmission members, e.g. levers, are arranged between the cams and the supporting elements.

The mode of operation of the positioning or steady rest is as follows:

A bearing point 41 for the steady rest is turned, e.g. with a tool 42, on the workpiece 6 which is clamped between the headstock 2 or the chuck 5 and the tailstock 3. Then the two supporting elements 39 are set at an eccentricity of zero, i.e. the hubs 37 are in the left end position illustrated in Fig. 1. When the two rollers 39, which serve as supporting elements and are preferably arranged with both ends symmetrical to a plane passing through the axis of rotation 19, are brought into contact with the prepared point 41 of the workpiece 6, they support the latter against offsets and oscillations.

When a certain length, the extent of which must be determined by experience of each indivdual case, has been turned on the workpiece 6 with the tool 42 which is outlined in Fig. 3 and is arranged on a slide and tool holder (not illustrated), the supporting elements 39 of the rest are removed from the workpiece 6 by loosening the screws 21 and pulling back the housing 23. With the aid of a clock dial micrometer which is secured to the machine bed 1 but is not illustrated the magnitude and phase of the eccentricity which has occurred is measured at the bearing point 41 on the workpiece 6 which has warped as a result of the released internal stresses or tensions. Now, the two hubs 37 are shifted in an axial direction along the inclined arbors 36 until their eccentricity corresponds to that measured by the clock dial micrometer. When the eccentricity has been corrected, the phases must be brought into agreement. To this end, the supporting elements 39, after screws 16 have been temporarily loosened by mutually turning the sprocket wheel 10 on the flange pulley 14, are brought into the correct position where the amplitudes of eccentricity of the bearing point 41 of the workpiece 6 and of the axes 34a of the supporting elements 39 are in agreement. If the adjustment range of the screws 16 in the slots 15 is inadequate, phase agreement can be obtained, after loosening the screw 44 in the shaft 25 and removing the pinion 28, by altering the tooth engagement between the gear wheel 29 and the pinion 28 readjusting the screws 16 in the slots 15. When the two supporting elements 39 have been brought up to the workpiece 6 and the screws 21 tightened, the supporting elements 39 perform exactly the same eccentric movement as the warped workpiece 6 at the bearing point 41 so that the said workpiece is always supported during subsequent machining operation without becoming crooked.

The positioning of the steady rest can, of course, also be used with any other mutual arrangement of lathe bed and lathe tool, only the drive of the cams and the mounting of the supporting elements will be designed accordingly.

With very long workpieces or with those which warp considerably, it may be necessary to use several rests of this type and to repeat the described adjusting operation several times in succession during the machining of the whole workpiece length.

If several rests are used one behind the other, the drive may be performed by the transmission members with the aid of a common telescopic tube, although the phase displacements would have to be effected separately in the housings 23.

Various changes and modifications may be made without departing from the spirit and scope of the present invention and it is intended that such obvious changes and modifications be embraced by the annexed claims.

Having now particularly described and ascertained the nature of my said invention and in what manner the same is to be performed, I declare that what I claim is:

1. A steady rest for a machine tool having a rotary work spindle; comprising rotatable supporting elements, motion transmission means extending from said work spindle to said supporting elements, a pair of bearing brackets disposed on said machine tool supporting said transmission means, said transmission means including sprocket wheel drive means carried by one of said bearing brackets and adjustable relative thereto to bring about angular phase displacement of said drive means relative to said work spindle, an arbor inclined at an acute angle relative to the spindle axis mounted on the other of said bearing brackets slidably carrying said supporting elements for contact with a workpiece, means for locking said supporting elements in position on said arbor, gear means carried by said other of said bearing brackets which transmits the rotary motion from the sprocket means to said inclined arbor.

2. A steady rest according to claim 1, wherein said arbor is of square cross-section.

References Cited in the file of this patent

UNITED STATES PATENTS

| | | |
|---|---|---|
| 371,062 | Hayes | Oct. 4, 1887 |
| 1,422,994 | Legon | July 18, 1922 |
| 2,069,426 | Smith | May 11, 1935 |
| 2,367,190 | Badrutt | Jan. 16, 1945 |
| 2,382,740 | Noffsinger | Aug. 14, 1945 |
| 2,401,597 | Winter | June 4, 1946 |
| 2,457,942 | Van Zandt | Jan. 2, 1949 |
| 2,791,872 | Wineka | May 14, 1957 |
| 2,813,445 | Twamley | Nov. 19, 1957 |
| 2,839,959 | Noill | June 24, 1958 |

FOREIGN PATENTS

| | | |
|---|---|---|
| 507,833 | Great Britain | June 21, 1939 |